No. 661,148. Patented Nov. 6, 1900.
J. HILLERY.
CHECK ROW CORN PLANTER.
(Application filed June 6, 1900.)
(No Model.) 4 Sheets—Sheet 1.
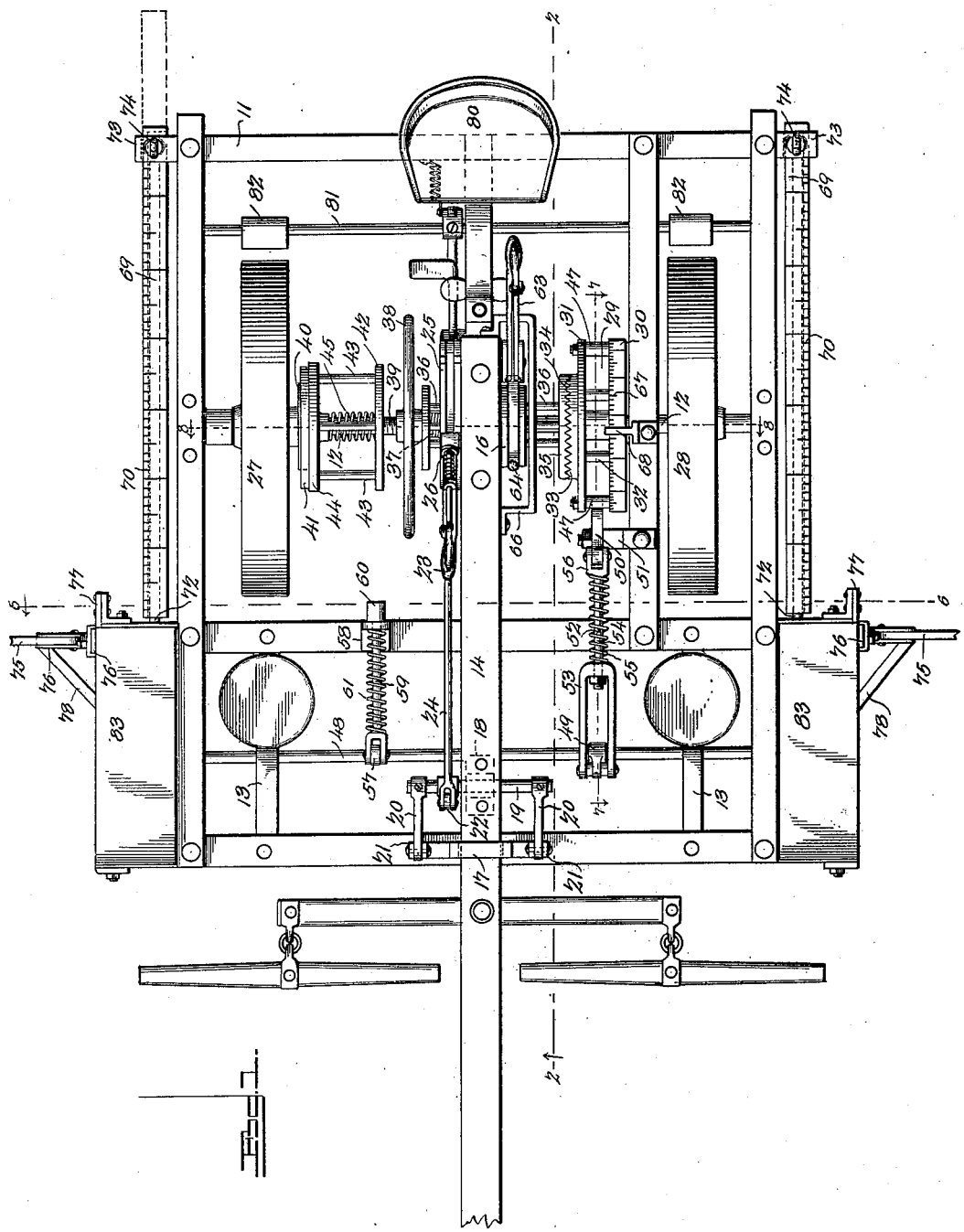
Witnesses
E. F. Stewart
J. W. Garner
John Hillery Inventor
by C. A. Snow & Co.
Attorneys No. 661,148. Patented Nov. 6, 1900.
J. HILLERY.
CHECK ROW CORN PLANTER.
(Application filed June 6, 1900.)
(No Model.) 4 Sheets—Sheet 2.
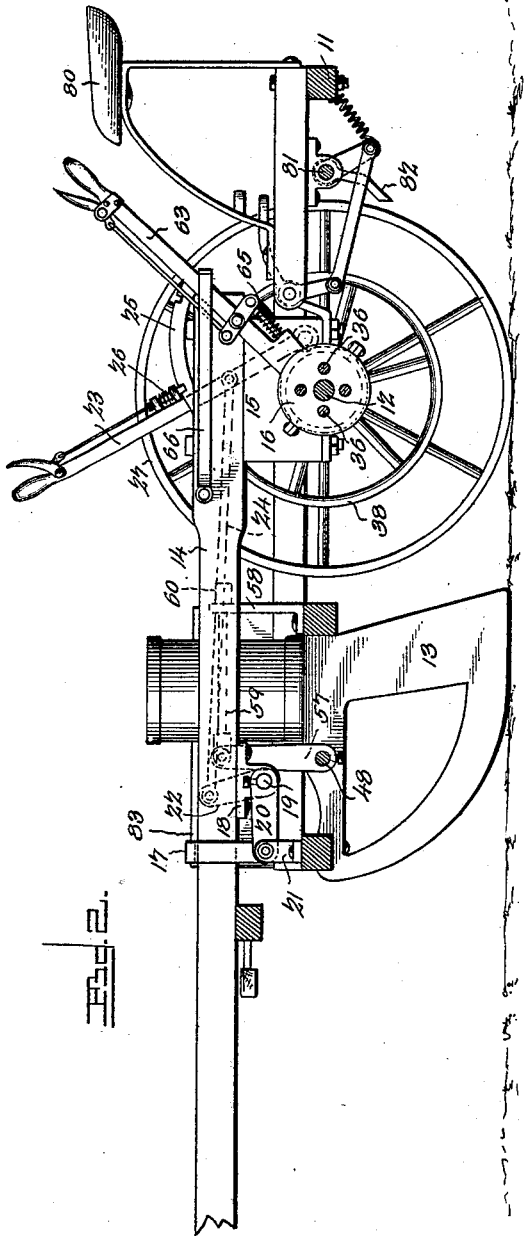
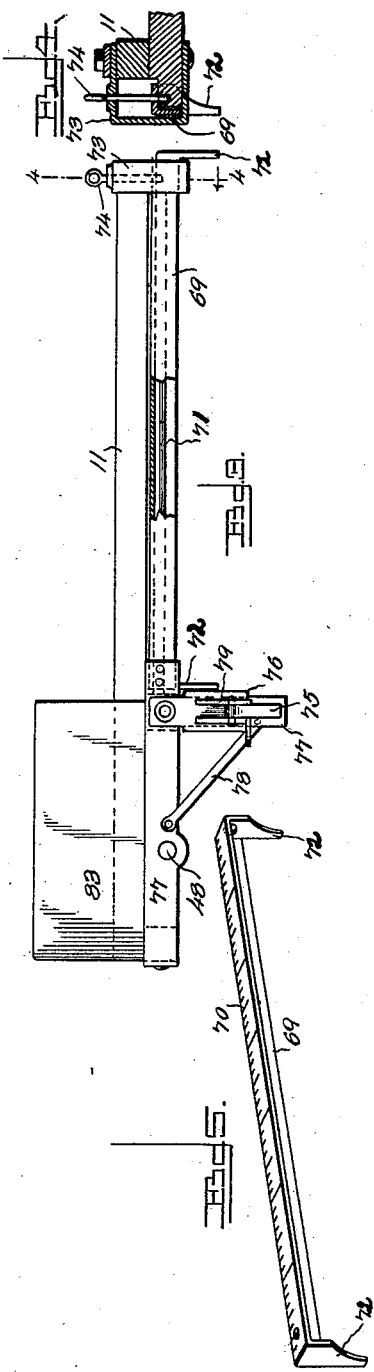
Witnesses
E. F. Stewart
J. W. Garner
John Hillery Inventor
by C. A. Snow & Co.
Attorneys No. 661,148. Patented Nov. 6, 1900.
J. HILLERY.
CHECK ROW CORN PLANTER.
(Application filed June 6, 1900.)
(No Model.) 4 Sheets—Sheet 3.
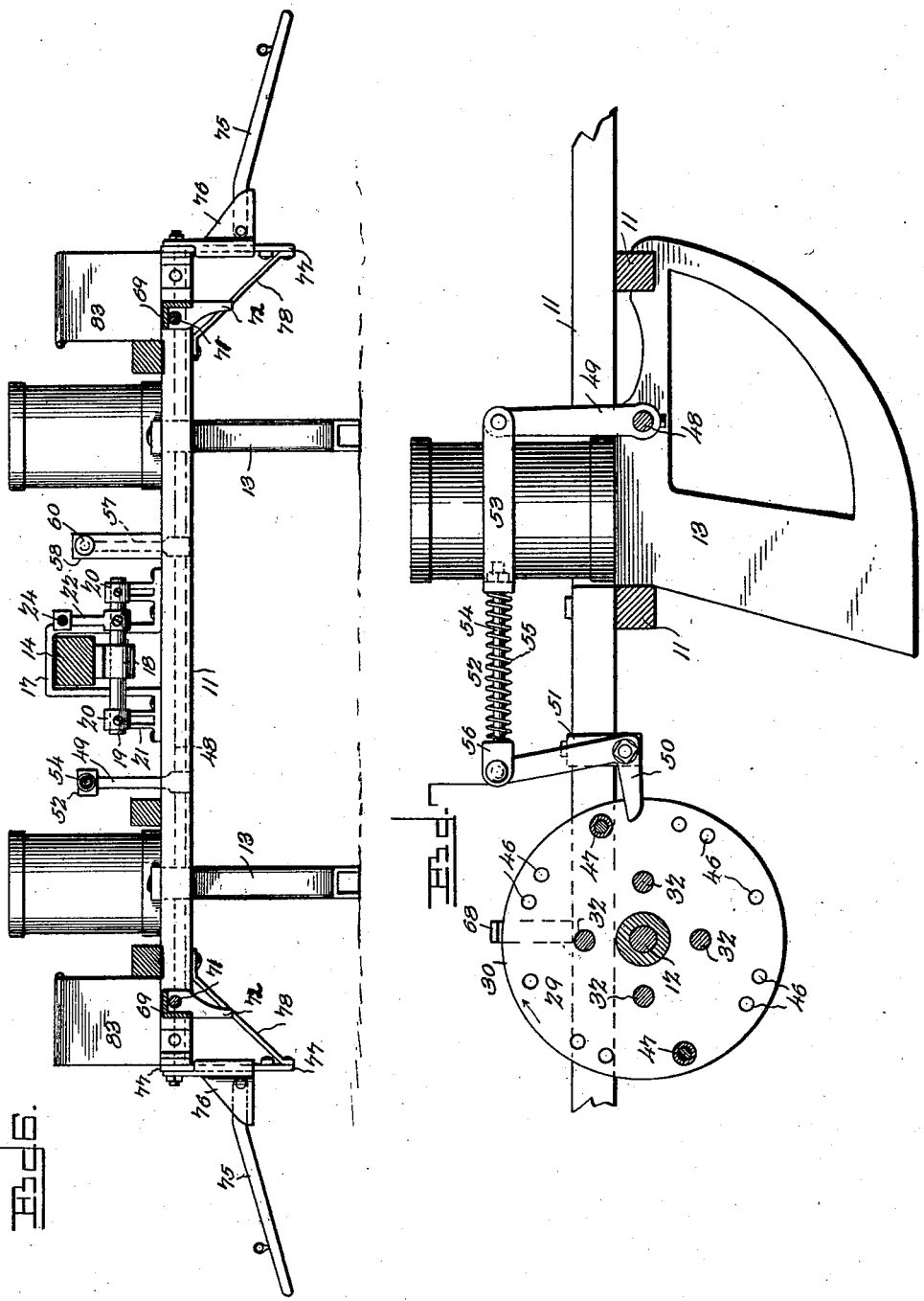
Witnesses
John Hillery Inventor
by C. A. Snow & Co.
Attorneys No. 661,148. Patented Nov. 6, 1900.
J. HILLERY.
CHECK ROW CORN PLANTER.
(Application filed June 6, 1900.)
(No Model.) 4 Sheets—Sheet 4.
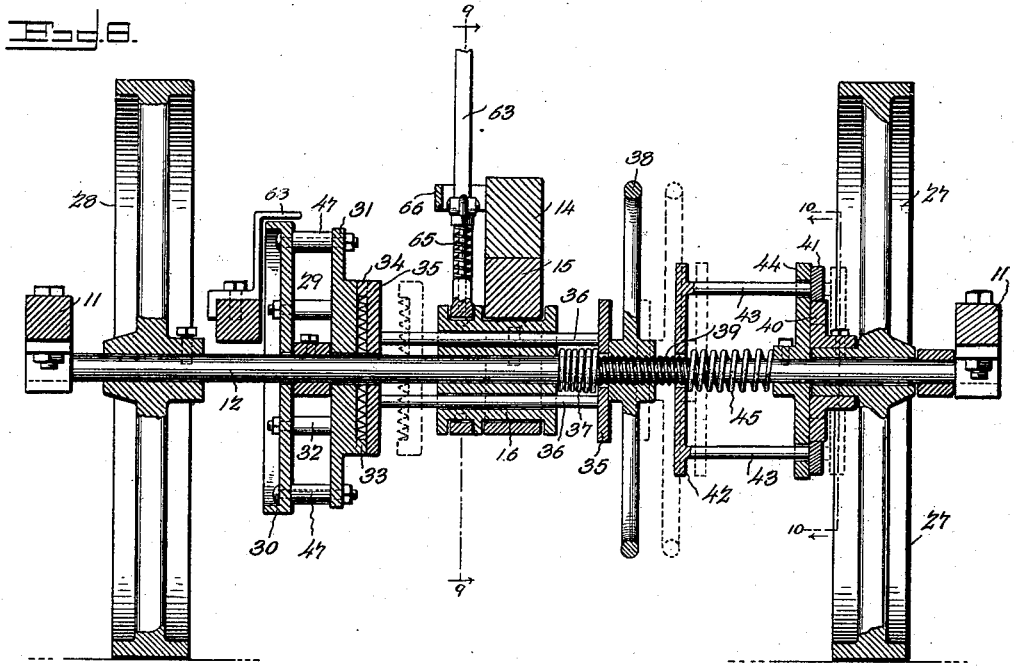
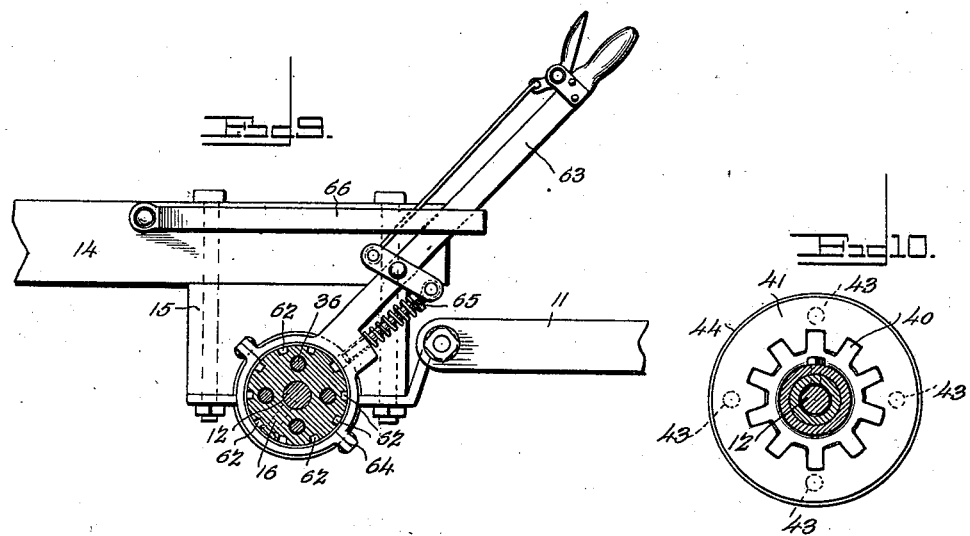
Witnesses
E. F. Stewart
J. W. Garner
John Hillery Inventor
By C. A. Snow & Co.
Attorneys

UNITED STATES PATENT OFFICE.

JOHN HILLERY, OF COLCHESTER, ILLINOIS.

CHECK-ROW CORN-PLANTER.

SPECIFICATION forming part of Letters Patent No. 661,148, dated November 6, 1900.

Application filed June 6, 1900. Serial No. 19,280. (No model.)

*To all whom it may concern:*

Be it known that I, JOHN HILLERY, a citizen of the United States, residing at Colchester, in the county of McDonough and State of Illinois, have invented a new and useful Check-Row Corn-Planter, of which the following is a specification.

My invention is an improved check-row corn-planter adapted for automatically planting corn in check-rows.

One object of my invention is to effect improvements in the devices for throwing the seed-dropping mechanisms into and out of gear with the axle-shaft.

Another object of my invention is to effect improvements in the devices for raising and lowering the front end of the frame to raise and lower the furrowing-runners.

Another object of my invention is to effect improvements in the devices for adjusting the planting mechanism.

Another object of my invention is to effect improvements in the devices for ascertaining the location of the planted hills at the ends of the rows.

My invention consists in the peculiar construction and combination of devices hereinafter fully set forth, and pointed out in the claims.

In the accompanying drawings, Figure 1 is a top plan view of a check-row corn-planter embodying my improvements. Fig. 2 is a vertical longitudinal sectional view of the same, taken on the line 2 2 of Fig. 1. Fig. 3 is a detail elevation of one side of the frame, showing the longitudinally-movable hill-finder bar and the pointer. Fig. 4 is a detail sectional view taken on the line 4 4 of Fig. 3. Fig. 5 is a detail perspective view of one of the hill-finder bars. Fig. 6 is a vertical transverse sectional view taken on the line 6 6 of Fig. 1. Fig. 7 is a detail sectional view taken on the line 7 7 of Fig. 1. Fig. 8 is a vertical transverse sectional view taken on the line 8 8 of Fig. 1. Fig. 9 is a detail sectional view taken on the line 9 9 of Fig. 8. Fig. 10 is a detail sectional view taken on the line 10 10 of Fig. 8.

The main frame 11 carries the seed-planting mechanism, which may be of any suitable construction at its front side and is mounted and adapted to be tilted or inclined on the axle-shaft 12, whereby the shoes or runners 13 may be raised or lowered from the ground. The draft pole or tongue 14 is provided on its lower side at its rear end with a block 15, bolted or otherwise secured thereto, which block bears upon a cylindrical drum 16, which is fast on the central portion of the axle-shaft 12 and rotates therewith, whereby a pivotal connection is formed between the axle-shaft and the rear end of the draft pole or tongue. The frame 11 is provided on its front side with a vertically-disposed yoke 17, which is bolted thereto and forms a guide through which the draft pole or tongue extends. In a bearing-block 18, which is bolted to the under side of the tongue, is journaled a rock-shaft 19, which is provided with forward-extending rock-arms 20, the front ends of which are pivotally connected to bearings 21 on the front side of the machine-frame. The said rock-shaft is provided, further, with a crank-arm 22, which extends from the upper side thereof. A hand-lever 23, the lower end of which is fulcrumed on one side of the block 15, is connected to the crank-arm 22 by a rod 24. A segment-rack 25 is secured on one side of the tongue at the rear thereof, and the hand-lever 23 is provided with the usual locking-dog 26, which by engagement with the segment-rack is adapted to secure the hand-lever at any desired adjustment. Driving and supporting wheels 27 28 are on the axle-shaft, the wheel 27 being loose thereon and the wheel 28 being fast therewith, and it will be understood that by means of the hand-lever 23 and the connections hereinbefore described between the same and the front side of the frame 11 the latter may be raised and lowered, so as to raise and lower the furrowing-shoes 13.

A master-wheel 29 is loose on the shaft or axle 12 and may be of any suitable construction. As here shown, the same comprises a pair of circular disks 30 31, connected together by a series of bolts 32. A clutch member 33 is formed on the side of disk 31, opposite the drum 16. A clutch member 34, which is connected to a disk-head 35 on the side of the drum 16 opposite the member 34 by a series of rods 36, which extend through openings in the drum 16, is adapted to engage and disengage the clutch member 34 to lock the master-wheel to the axle-shaft or permit it to remain idle thereon when the axle-shaft is in rotation. A spring 37 on the axle-shaft exerts its force against the inner side of the disk-head 35 and tends to move the clutch member 34 out of engagement with clutch member 33. A hand-wheel 38 has its hub provided with interior screw-threads, which engage a threaded section 39 of the axle-shaft, the hand-wheel being thereby adapted by turning the same on said axle-shaft to move longitudinally thereon toward and from the disk-head 35, and hence enable the master-wheel 29 to be either locked to or unclutched from the axle-shaft.

The loose wheel 27 is provided with a clutch member 40, which is adapted to be engaged and disengaged by a clutch member 41. The latter is connected to a disk-head 42, which is loose on the axle-shaft, by bolt-rods 43, which pass through openings in a centering-disk 44, which is fast to axle-shaft 12. A spring 45 on the axle-shaft bears against the inner side of the disk-head 42 and normally keeps the clutch member 41 in engagement with the clutch member 40, hence normally locking the loose wheel 27 to the axle-shaft. By turning the hand-wheel 38 in one direction to unclutch the master-wheel 29 the clutch member 41 may be unclutched from the wheel 27, thereby unlocking the latter from the axle-shaft, and by reversing the motion of the hand-wheel the said wheel 27 may be locked to the axle-shaft and the master-wheel 29 also locked thereto. The disks 30 31 of the master-wheel 29 are provided with a series of coincident openings 46, which are appropriately spaced apart and in which one or more tappets 47 may be secured to operate the seed-dropping mechanism, which I will now describe.

The seed-dropping mechanisms, which may be of any suitable construction, are actuated by a rock-shaft 48, the same being journaled in suitable bearings, with which the frame is provided, and said rock-shaft has a rock-arm 49. A bell-crank lever 50 is fulcrumed to a bracket 51, which is secured to one of the bars or members of frame 11, the rearward-extending arm of said bell-crank lever being interposed in the path of the tappet or tappets 47. A link 52 connects the upper arm of the bell-crank lever with the rock-arm 49. The said link comprises the two sections or members 53 54. The member 53 is a yoke, and the member 54 is a rod which is movable lengthwise in one direction independently of the yoke. A coiled extensile spring 55 bears between the head of the yoke and an enlargement, as at 56, with which the rod 54 is provided. It will be understood from the foregoing and by reference to the drawings, more particularly to Figs. 1 and 7 thereof, that when the master-wheel 29 rotates the tappet or tappets carried thereby by engagement with the bell-crank lever will turn the rock-shaft 48 in one direction. Said rock-shaft is provided with a rock-arm 57, which projects from the upper side thereof and is connected to a vertical standard 58, with which the frame 11 is provided, by a rod 59, which is pivotally connected to the upper end of rock-arm 57 and passes through an opening in the standard and is provided at its rear end with a head 60, which, by coaction with the standard, limits the forward movement or throw of the rock-arm 57. A spring 61 exerts its tension on the said arm 57, and as the tappet clears the bell-crank lever 50 after having turned the rock-shaft 48 in one direction the spring 61 moves the said rock-shaft in the reverse direction, as will be understood.

I will now describe my improved means for revolving the shaft 12 manually in order to move the machine a slight distance forward or rearward when adjusting the same to secure the planting of the corn in check-rows.

The drum 16 is provided with a series of peripheral notches 62. A hand-lever 63 is swiveled on the said drum, as at 64, and is provided with a spring-pressed dog 65, which may be engaged with the said notches in succession to lock the lever 63 to the shaft 12, and hence enable the latter to be turned manually to move the machine a slight distance either forward or rearward. A guide-bar 66, which is bolted to the draft-tongue, limits the movement of the hand-lever 63.

The master-wheel 29 is provided on the periphery of its disk 30 with a measuring-scale 67, which in coaction with a pointer 68 indicates the distance in inches that the machine has traveled at any time between the planting of two hills of corn. In connection with the scale 67 I provide a pair of hill-finder bars 69, which are longitudinally disposed on the sides of frame 11 and adapted to be drawn lengthwise rearward therefrom to any suitable extent, the said hill-finder bars being provided with measuring-scales 70, which in coaction with fixed pointers with which the sides of the frame 11 are provided, or which are formed by the front sides of yokes 73, hereinafter described, enable the hill last planted to be found before turning the machine when the same reaches the end of a row, thus enabling a stake to be driven opposite the last hill planted to serve as a guide in the adjustment of the machine in planting another row. Any suitable means may be employed for guiding and supporting the hill-finder bars. In the form of my invention herein shown I provide longitudinally-disposed rods 71 on the outer sides of the frame 11, on which the hill-finder bars are supported, the ends of the hill-finder bars being provided with downturned brackets 72, having openings to receive the rods 71, on which rods said hill-finder bars are thus adapted to slide longitudinally, and said hill-finder bars are further guided by eyes or yokes 73 at the rear side of frame 11. When the hill-finder bars are not in use, they are moved forward to their entire extent and are held in the position shown in Figs. 1 and 3 by pins 74 in registering openings, with which the guides 73 and hill-finder bars are provided.

I also provide the check-row corn-planter with pointer-bars 75, which are disposed on opposite sides of frame 11 in line with the heels of the seed-spouts and are pivoted at their inner ends in brackets 76, which depend from supporting-bars 77 on lateral extensions 78 of frame 11 at the front corners thereof. Said brackets are provided with suitable braces, and the sides thereof which bear against opposite sides of the inner portion of the pointer-bars form springs, as at 79, which by frictional contact with the sides of the pointer-bars support the same when turned to a vertical position. The said pointer-bars are employed in connection with the stakes driven at the ends of the rows to adjust the machine when starting a new row.

The machine is provided with a seat 80 for the driver, a rock-shaft 81, having scrapers 82 to operate on the wheels 27 28, as is usual in machines of this class, and is also provided with boxes 83, in which the stakes that are used in connection with the machine, as hereinbefore stated, are kept.

Having thus described my invention, I claim—

1. In a check-row corn-planter, in combination with the seed-dropping mechanism, an axle-shaft, a master-wheel, loose on said shaft, to actuate the seed-dropping mechanism, supporting and traction wheels, one fast and the other loose on said shaft, a clutch to lock said master-wheel to the shaft, a spring to normally unclutch the same, a spring-pressed normally effective clutch to lock said loose traction-wheel to said shaft, and a hand-wheel, operative on a screw-threaded section of the shaft, and disposed between said clutches, to operate the same, substantially as described.

2. In a planter, in combination with the seed-dropping mechanism, an axle-shaft, a master-wheel loose on said shaft to actuate the seed-dropping mechanism and having a measuring-scale coacting with a fixed point, supporting and traction wheels, one fast and the other loose on said shaft, a clutch to lock said master-wheel to said shaft, a disk free to travel longitudinally of the shaft, rods connecting said disk to said clutch, a drum, fast to the shaft and through which said rods pass, a hand-lever and connections to manually rotate said master-wheel by turning said clutch, a clutch to lock the loose traction-wheel to said shaft and means to operate said clutches, substantially as described.

3. In a check-row corn-planter, in combination with the seed-dropping mechanism, an axle-shaft, a master-wheel, loose on said shaft, to actuate the seed-dropping mechanism and having a measuring-scale coacting with a fixed point, supporting and traction wheels, one fast and the other loose on said shaft, a clutch to lock said master-wheel to the shaft, a spring to normally unclutch the same, a disk free to travel longitudinally of the shaft, rods connecting said disk to said clutch, a drum, fast to the shaft and through which said rods pass, a hand-lever and connections to manually rotate said master-wheel by turning said clutch, a spring-pressed, normally effective clutch to lock said loose traction-wheel to said shaft, a hand-wheel, engaged by a screw-threaded section of said shaft, and operating between the disk of the master-wheel clutch and a member of the loose traction-wheel clutch, to operate said clutches, and a hill-finder bar adapted to be extended longitudinally from the planter, substantially as described.

4. In a check-row corn-planter, the combination with a seed-dropping mechanism, of an axle-shaft, a master-wheel to actuate the seed-dropping mechanism, loose on said shaft, said master-wheel having a measuring-scale coacting with a fixed pointer, means to lock said master-wheel to said shaft, a traction-wheel to rotate the latter, means to rotate said shaft manually, and a hill-finder bar adapted to be extended longitudinally from the planter, for the purpose set forth, substantially as described.

5. In a planter, the combination of the frame having the planting mechanism at its front side, the axle-shaft on which said frame is adapted to be tilted to raise and lower the front side thereof, supporting and traction wheels on said shaft, a hand-lever, a draft pole or tongue pivoted to said shaft, a rock-shaft having a crank-arm and rock-arms, the latter being connected to the front side of the frame, and a rod connecting said crank-arm to the hand-lever, substantially as described.

6. In a check-row corn-planter, the brackets secured to the sides of the frame in line with the heels of the seed-spouts, the pointer-arms pivotally attached at their inner ends to said brackets and adapted to be extended outward therefrom, supported thereby and to be upturned and supported in said brackets, for the purpose set forth, substantially as described.

7. In a check-row corn-planter, the vertical depending brackets attached to the sides of the frame in line with the heel of the seed-spouts and having the spring sides, and the pointer-arms having their inner ends pivoted to said brackets, between the spring sides thereof, the latter by frictional contact with the pointer-arms serving to support the latter when turned to an upright position, substantially as described.

In testimony that I claim the foregoing as my own I have hereto affixed my signature in the presence of two witnesses.

JOHN HILLERY.

Witnesses:
J. U. SCOTT,
EDWARD HILLERY.